United States Patent
Liu et al.

(10) Patent No.: US 9,712,865 B2
(45) Date of Patent: Jul. 18, 2017

(54) METHOD, DEVICE AND SYSTEM FOR SWITCHING BACK TRANSFERRED-FOR-PLAY DIGITAL MEDIA CONTENT

(71) Applicant: ZTE Corporation, Shenzhen, Guangdong (CN)

(72) Inventors: Haijun Liu, Shenzhen (CN); Yunjun Zhou, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 103 days.

(21) Appl. No.: 14/443,726

(22) PCT Filed: Aug. 28, 2013

(86) PCT No.: PCT/CN2013/082461
§ 371 (c)(1),
(2) Date: Jun. 19, 2015

(87) PCT Pub. No.: WO2014/075486
PCT Pub. Date: May 22, 2014

(65) Prior Publication Data
US 2015/0334456 A1   Nov. 19, 2015

(30) Foreign Application Priority Data

Nov. 19, 2012 (CN) .......................... 2012 1 0466577

(51) Int. Cl.
*H04N 7/18*    (2006.01)
*H04N 21/436*  (2011.01)
(Continued)

(52) U.S. Cl.
CPC ....... *H04N 21/43615* (2013.01); *G06F 3/017* (2013.01); *H04N 21/4122* (2013.01);
(Continued)

(58) Field of Classification Search
CPC ............................................... H04N 21/43615
See application file for complete search history.

(56) References Cited

U.S. PATENT DOCUMENTS

2005/0055716 A1     3/2005  Louie
2007/0083910 A1*    4/2007  Haneef .................. H04N 7/163
                                                    725/135
(Continued)

FOREIGN PATENT DOCUMENTS

CA        2827387 A1      8/2012
CN    101335586 A        12/2008
(Continued)

OTHER PUBLICATIONS

Supplementary European Search Report in European application No. 13855199.9, mailed on Jan. 7, 2016.
(Continued)

*Primary Examiner* — Gigi L Dubasky
(74) *Attorney, Agent, or Firm* — Oppedahl Patent Law Firm LLC

(57) ABSTRACT

Provided are a method, device and system for switching back transferred-for-play digital media content. The method includes: after digital media content being played at a first equipment is transferred to a second equipment, the second equipment identifies a user action; and the second equipment switches the digital media content being played back to the first equipment according to the identified user action.

18 Claims, 5 Drawing Sheets

(51) Int. Cl.
  *H04N 21/472* (2011.01)
  *G06F 3/01* (2006.01)
  *H04N 21/41* (2011.01)
  *H04N 21/414* (2011.01)
  *H04N 21/4223* (2011.01)
  *H04N 21/44* (2011.01)
  *H04N 21/442* (2011.01)
  *H04N 21/485* (2011.01)

(52) U.S. Cl.
  CPC ... *H04N 21/41407* (2013.01); *H04N 21/4223* (2013.01); *H04N 21/44008* (2013.01); *H04N 21/44218* (2013.01); *H04N 21/47217* (2013.01); *H04N 21/485* (2013.01)

(56) References Cited

U.S. PATENT DOCUMENTS

| | | | |
|---|---|---|---|
| 2008/0318672 | A1 | 12/2008 | Ramaswamy |
| 2010/0169945 | A1 | 7/2010 | Kennedy |
| 2010/0180307 | A1 | 7/2010 | Hayes |
| 2011/0083111 | A1 | 4/2011 | Forutanpour |
| 2011/0175822 | A1 | 7/2011 | Poon |
| 2011/0316790 | A1 | 12/2011 | Ollila |
| 2012/0030632 | A1* | 2/2012 | McRae ............. G06F 3/017 715/863 |
| 2012/0127197 | A1 | 5/2012 | Sakayori |
| 2012/0169482 | A1 | 7/2012 | Chen |
| 2012/0198499 | A1 | 8/2012 | Louie |
| 2012/0254929 | A1 | 10/2012 | Oztaskent |
| 2012/0254931 | A1 | 10/2012 | Oztaskent |
| 2013/0217499 | A1 | 8/2013 | Ramaswamy |
| 2013/0247121 | A1* | 9/2013 | Yuan ............. H04M 1/7253 725/110 |
| 2013/0347044 | A1 | 12/2013 | Lee |
| 2014/0033134 | A1* | 1/2014 | Pimmel ............. H04L 67/1074 715/863 |
| 2014/0282066 | A1* | 9/2014 | Dawson ............. H04L 65/4038 715/748 |

FOREIGN PATENT DOCUMENTS

| | | |
|---|---|---|
| CN | 101447846 A | 6/2009 |
| CN | 101505408 A | 8/2009 |
| CN | 101710948 A | 5/2010 |
| CN | 201590840 U | 9/2010 |
| CN | 101931629 A | 12/2010 |
| CN | 201789504 U | 4/2011 |
| CN | 102204219 A | 9/2011 |
| CN | 102445985 A | 5/2012 |
| CN | 102479051 A | 5/2012 |
| CN | 102510541 A | 6/2012 |
| CN | 102523502 A | 6/2012 |
| CN | 102630057 A | 8/2012 |
| CN | 102769802 A | 11/2012 |
| CN | 102984592 A | 3/2013 |
| CN | 103019555 A | 4/2013 |
| JP | 200556425 A | 3/2005 |
| JP | 2011238095 A | 11/2011 |
| JP | 2012114560 A | 6/2012 |
| KR | 1020080056005 A | 6/2008 |
| KR | 1020110046791 A | 5/2011 |
| WO | 2011041434 A1 | 4/2011 |
| WO | 2012094522 A1 | 7/2012 |
| WO | 2012100186 A1 | 7/2012 |
| WO | 2012112011 A2 | 8/2012 |

OTHER PUBLICATIONS

International Search Report in international application No. PCT/CN2013/082461, mailed on Nov. 7, 2013.
English Translation of the Written Opinion of the International Search Authority in international application No. PCT/CN2013/082461, mailed on Nov. 7, 2013.
International Search Report in international application No. PCT/CN2013/083012, mailed on Dec. 12, 2013.
English Translation of the Written Opinion of the International Search Authority in international application No. PCT/CN2013/083012, mailed on Dec. 12, 2013.
Supplementary European Search Report in European application No. 13861180.1, mailed on Nov. 13, 2015.

* cited by examiner

METHOD, DEVICE AND SYSTEM FOR SWITCHING BACK TRANSFERRED-FOR-PLAY DIGITAL MEDIA CONTENT

TECHNICAL FIELD

The present disclosure relates to the field of computer techniques, and in particular to a method, device and system for switching back transferred-for-play digital media content.

BACKGROUND

With the development of digital multimedia and networks, entertainment experiences in daily life are enriched. Existing techniques enable people at home to enjoy high definition TV programs from a digital disk, cable TV or the Internet and the like. In addition, users are enabled to experience stereo, 5.1 acoustic channel, 7.1 acoustic channel or even more realistic sound effect; people can also implement these experiences using a tablet electronic device (pad) or a mobile phone; moreover, playing of digital content can be transferred between equipments through a network, and the playing in an equipment can be controlled through a remote controller or through a gesture, such as control of switching to a previous and a next channel.

In the related art, for controlling multiple equipments, generally each equipment has a respective remote controller to perform control, but these remote controllers are not universal, and most of these controllers, such as a traditional TV set or sound box, cannot be networked. There may be some network enabled controllers, for example, an equipment (e.g., a mobile phone, a pad) having computing and networking capabilities can be loaded with software supporting intercommunication protocols to control another equipment. Gesture control is currently a relatively new control manner in which a camera on an equipment monitors gesture actions and then analyzes and identifies them, finally the gesture actions are converted to control of the equipment.

With the development of techniques, there are increasing demands for sharing and transferring of content being played between multiple equipments, and the above control method is apparently not so convenient; people may need to select one remote controller corresponding to a specific equipment from a pile of remote controllers and change remote controllers from time to time to control different equipments, or the equipment can be controlled through operations on a pad or a mobile phone by people familiar with basic operations on computers, or a single equipment is controlled by simple gestures. People prefer to use an easier and more natural operation way to control shared playing or transferred playing of content.

Some products in the related art enable people to transfer digital media content being played on an equipment to another equipment, for example, an existing Universal Plug and Play (UPnP) protocol enables transferring of video played on a mobile phone to a TV. Some manufacturers of TVs, mobile phones, players and home storages have also produced similar products.

When such a play transferring functionality is used, it is desired in certain cases that transferred play can be transferred back, for example, content transferred and watched on a TV is transferred to its original mobile phone so as to be carried out for play, or after being transferred back to the mobile phone, the content is transferred to another equipment such as a computer so as to be watched thereon. People can, of course, implement these functions with a menu of a computer application on a TV, but it is desired that the operation can be easier and more natural.

It is desired that content, after being subjected to inter-equipment transfer and collaborative play, can be switched back to its original equipment through an easier and more natural operation, so as to provide users with more relaxed and enjoyed entertainment, and users also require that they can understand and get started more easily when new functions of an equipment are introduced.

SUMMARY

Embodiments of the disclosure provide a method, device and system for switching back transferred-for-play digital media content so that the content, after being subjected to inter-equipment transfer and collaborative play, can be switched back to its original equipment through an easier and more natural operation.

An embodiment of the disclosure provides a method for switching back transferred-for-play digital media content, and the method includes: after digital media content being played at a first equipment is transferred to a second equipment, the second equipment identifies a user action; and the second equipment switches the digital media content being played back to the first equipment according to the identified user action.

In an embodiment, the method may further include: after the digital media content being played at the first equipment is transferred to the second equipment, the second equipment stores information of the first equipment;

specifically, the step that the second equipment switches the digital media content being played back to the first equipment include: the second equipment notifies, according to the information of the first equipment, the first equipment to continue playing the digital media content.

In an embodiment, the method may further include: after the second equipment notifies, according to the information of the first equipment, the first equipment to continue playing the digital media content, the second equipment stops playing the digital media content, and disconnects from a content source corresponding to the digital media content.

In an embodiment, the step that the second equipment switches the digital media content being played back to the first equipment according to the identified user action may specifically include: the second equipment identifies a user action with an identification device, and determines whether the identified user action is matched with preset action determination data, if yes, switches the digital media content being played back to the first equipment.

In an embodiment, the identification device may include a camera; the user action may include a gesture action, a eyeball action and a body gesture, wherein the gesture action may include a backward bending of an arm after a grasp, a backward bending of an arm after the arm and corresponding palm are straightened to face the identification device, and a predetermined number of swings of an arm and corresponding palm towards the body of a user after being raised to face the identification device.

In an embodiment, the method may further include: after the second equipment notifies, according to the information of the first equipment, the first equipment to continue playing the digital media content, the second equipment receives a response message from the first equipment, and acquires information carried in the response message regarding whether switching back of the digital media content is allowed.

In an embodiment, the step that the second equipment stops playing the digital media content, and disconnects from a content source corresponding to the digital media content may specifically include: if determining according to the response message that the first equipment allows to switch back to the digital media content, the second equipment stops playing the digital media content, and disconnects from the content source corresponding to the digital media content.

An embodiment of the disclosure further provides a device for switching back transferred-for-play digital media content, including an identification module configured to, after digital media content being played at a first equipment is transferred to a second equipment, identify a user action; and a switching back module configured to switch the digital media content being played back to the first equipment according to the identified user action.

In an embodiment, the device may further include a storage module configured to store information of the first equipment; accordingly the switching back module may be configured to notify, according to the information of the first equipment, the first equipment to continue playing the digital media content.

In an embodiment, the switching back module may be configured to stop playing the digital media content, and disconnect from a content source corresponding to the digital media content.

In an embodiment, the identification module may be configured to identify a user action with an identification device, and determine whether the identified user action is matched with preset action determination data, if yes, switch the digital media content being played back to the first equipment.

In an embodiment, the identification device may include a camera; the user action may include a gesture action, a eyeball action and a body gesture, wherein the gesture action may include a backward bending of an arm after a grasp, a backward bending of an arm after the arm and corresponding palm are straightened to face the identification device, and a predetermined number of swings of an arm and corresponding palm towards the body of a user after being raised to face the identification device.

In an embodiment, the device may further include a reception module configured to receive a response message from the first equipment, and acquire information carried in the response message regarding whether switching back of the digital media content is allowed.

In an embodiment, the switching back module may be configured to, if it is determined according to the response message that the first equipment allows to switch back to the digital media content, stop playing the digital media content, and disconnect from the content source corresponding to the digital media content.

An embodiment of the disclosure further provides a system for switching back transferred-for-play digital media content, which includes the device for switching back transferred-for-play digital media content as described above and a first equipment, specifically, the first equipment is configured to, after the digital media content being played at the first equipment is transferred to the device for switching back transferred-for-play digital media content, continue playing digital media content switched back to the first equipment under the control of the device for switching back transferred-for-play digital media content.

Beneficial effects of embodiments the disclosure are as follows.

In the embodiments of the disclosure, an original equipment is notified to take over playing of the digital media content through identification of a user operation, so that the content, after being subjected to inter-equipment transfer and collaborative play, can be switched back to its original equipment through an easier and more natural operation; by means of the disclosure, it is possible to provide users with more convenient experiences of and more natural and easier control of digital media content, and thus more relaxed and enjoyed entertainment, and users can understand and get started more easily when new functions of an equipment are introduced, thereby improving user experiences on the equipment.

The above description is only a summary of technical solutions of embodiments of the disclosure, and specific embodiments of the disclosure will be exemplified below so as to make technical means the embodiments of the disclosure more clear so that they can be implemented in accordance with content of the specification and so as to make above and other objectives, features and advantages better understood.

BRIEF DESCRIPTION OF THE DRAWINGS

Various other advantages and benefits will become clear for those skilled in the art on reading detailed description of preferred embodiments below. Accompanying drawings are only intended to illustrate the preferred embodiments instead of being regarded as a limitation of the disclosure. Furthermore, like reference numerals refer to like components throughout the accompanying drawings, in which.

DETAILED DESCRIPTION

Exemplary embodiments of the disclosure will be further elaborated below with reference to accompanying drawings. Though the drawings shows exemplary embodiments of the disclosure, it should be appreciated that the disclosure may be implemented in various forms instead of being limited by embodiments illustrated herein. On the contrary, the provision of these embodiments is intended to make the disclosure thoroughly understood and to deliver a complete disclosure to those skilled in the art.

In order to provide a function which enables content, after being subjected to inter-equipment transfer and collaborative play, can be switched back to its original equipment through an easier and more natural operation, the disclosure provides a method, device and system for switching back transferred-for-play digital media content, and the disclosure will be further elaborated below with reference to accompanying drawings in conjunction with specific embodiments. It should be understood that the specific embodiments are only used to interpret the disclosure instead of limiting the disclosure.

Embodiments of the Method

Figure 1:
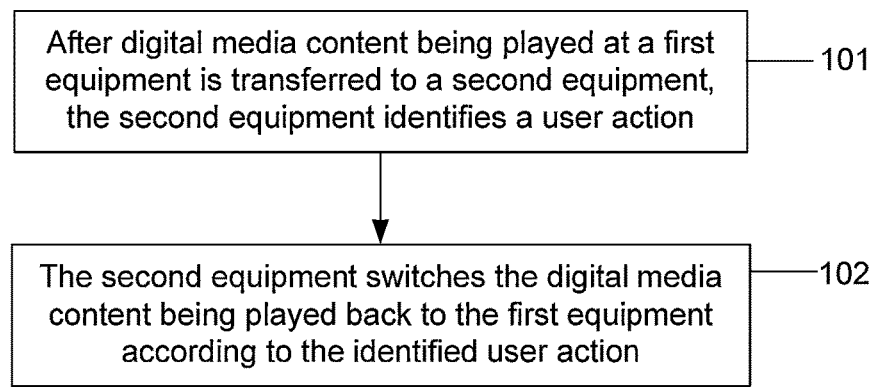
FIG. 1 is a flow chart of a method for switching back transferred-for-play digital media content according to an embodiment of the disclosure.

According to an embodiment of the disclosure, provided is a method for switching back transferred-for-play digital media content, FIG. 1 is a flow chart of a method for switching back transferred-for-play digital media content according to an embodiment of the disclosure, and it should be noted that in the embodiment, a first equipment is a source equipment, required to have network functionality to be capable of being connected to other equipments, and after receiving an instruction of requesting for returning transferred-for-play content, responding to its peer equipment with a response message; a second equipment needs to have network and identification capabilities, specifically, the network capability refers to the capability to transmit/receive messages to/from other equipments; and the identification capability refers to a capability to identify that digital media content is about to be transferred back to the first equipment, and the identification includes identification of a grasp action, a backward bending of an arm and the like.

As shown in FIG. 1, a method for switching back transferred-for-play digital media content according to an embodiment of the disclosure includes the following steps:

step 101, after digital media content being played at a first equipment is transferred to a second equipment, the second equipment identifies a user action.

Preferably, in step 101, after the digital media content being played at the first equipment is transferred to the second equipment, the following processing may be further included: 1. the second equipment stores information of the first equipment; 2. the step that the second equipment switches the digital media content being played back to the first equipment; 3. the second equipment notifies, according to the information of the first equipment, the first equipment to take over playing of the digital media content.

step 102, the second equipment switches the playing of the digital media content back to the first equipment according to the identified user action.

Preferably, after step 102, the following processing may be included: the second equipment stops playing the digital media content, and disconnects from a content source corresponding to the digital media content.

Step 102 specifically includes: 1. the second equipment identifies the user action with an identification device; 2. it is determined whether the identified user action is matched with preset action determination data, if yes, the playing of digital media content is switched back to the first equipment.

Specifically, the user action includes a gesture action, a eyeball action and a body gesture, wherein the gesture action includes a backward bending of an arm after a grasp, a backward bending of an arm after the arm and corresponding palm are straightened to face the identification device, and a predetermined number of swings of an arm and corresponding palm towards the body of a user after being raised to face the identification device.

In step 102, the above method may further include: after the second equipment notifies, according to the information of the first equipment, the first equipment to take over playing of the digital media content, the second equipment receives a response message from the first equipment, and acquires information carried in the response message regarding whether switching back of playing of the digital media content is allowed. If determining according to the response message that the first equipment allows the switch back, the second equipment stops playing the digital media content, and disconnects from the content source corresponding to the digital media content.

In an embodiment of the disclosure, after step 102 is implemented, the first equipment may confirm whether to play digital media content switched back to the first equipment, and the confirmation operation may be a menu option displayed by the first equipment or a reception gesture.

The above technical solutions according to embodiments of the disclosure will be elaborated below with reference to the accompanying drawings.

Figure 2:
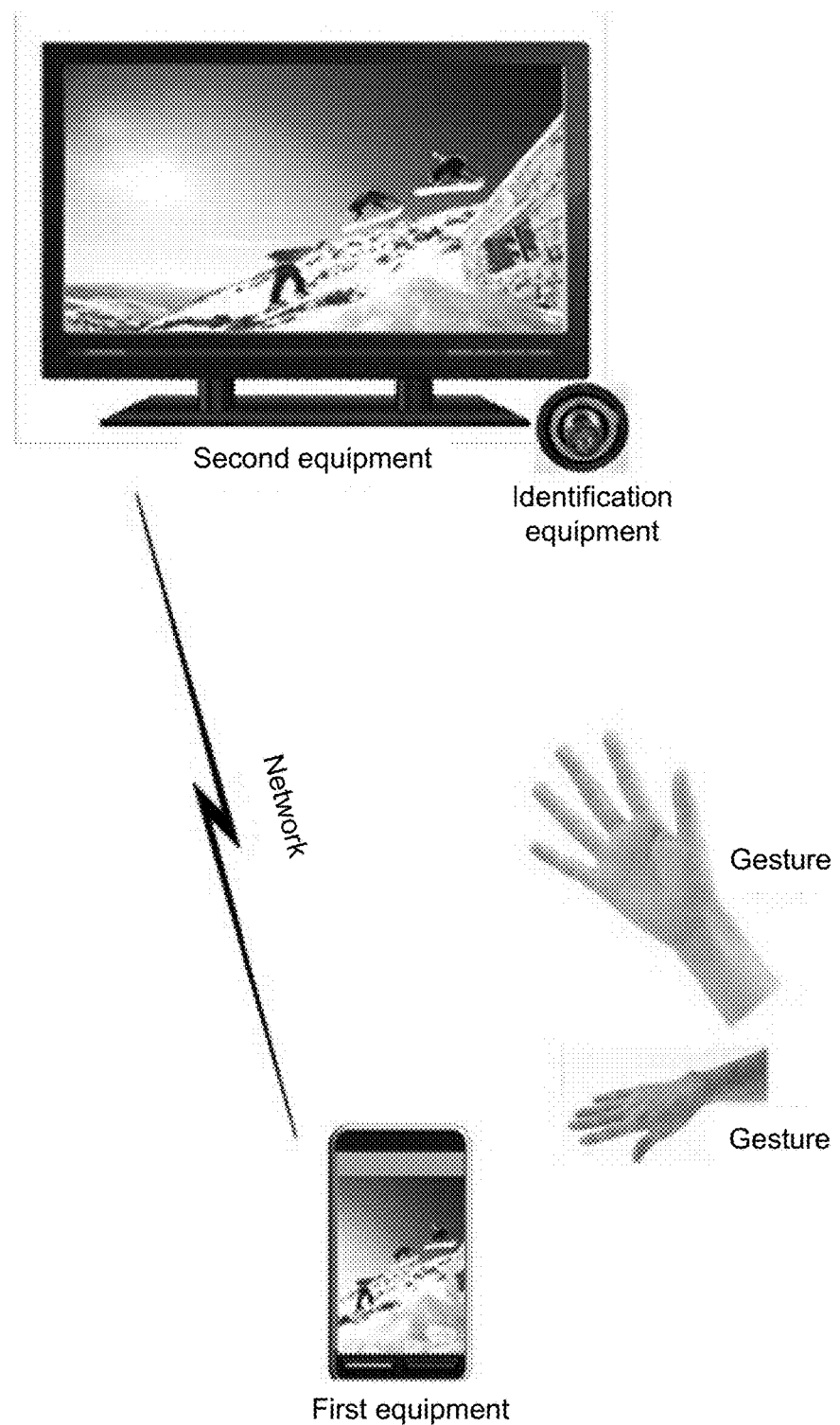
FIG. 2 is a schematic diagram showing control of equipments according to an embodiment of the disclosure.

FIG. 2 is a schematic diagram showing control of equipments according to an embodiment of the disclosure, as shown in FIG. 2, there are two equipments: a pad and a TV; in the example, the pad serves as a first equipment playing digital media content that may include a video file stored locally, a video stream from an IP network, a local audio, an audio stream from an IP network or a desktop of an operation system.

In the embodiment, the pad has an interface for interacting with users, which enables a user to input determination information for a process, e.g., approval or rejection to switching back transferred-for-play digital media content.

In addition, the pad has a network interface that supports IEEE 802.11b/g/n and IEEE 802.3, thus being capable of being connected to an IP network. Modules within the pad may further have a network service capability that enables the pad to be found by and connected to other equipments, and to transmit/receive messages to/from other equipments.

In an example, the TV is a second equipment and has one camera. Users can, in front of the camera, make actions such as throwing, releasing or pointing with a hand. The TV has a capability of identifying that a transferred digital media content being played is to be transferred back, that is, the TV can acquire, through a camera, a motion image so that it can identify, according to a predefined rule, that transferred digital media content that is being played is required to be transferred back to the pad for play, namely knowing that the digital media content is about to be transferred, and such a identification is implemented in the following context: a throwing action, a releasing action, a pointing action or a splay of a hand on a touch screen (if the TV has a touch screen). In addition, the TV has a network interface that supports IEEE 802.11b/g/n and IEEE 802.3, thus being capable of being connected to an IP network. Modules within the TV may further have a network service capability that enables the pad to be found by and connected to other equipments, and to transmit/receive messages to/from the pad. The pad and the TV are connected with each other through a network.

Preferably, in the example, actions that can be identified by the TV include:

1. a backward grasp, namely a backward bending of an arm after a grasp;

2. a backward wave, namely a backward bending of an arm after the arm and corresponding palm are straightened to face the camera of the TV; and 3. a swing, namely two or more swings of an arm and corresponding palm towards the body of a user after being raised to face the camera of the TV.

On the TV, the identification of gesture actions can be implemented using the histogram method or the Markov model method. Firstly, gesture actions of a user should fall within a capturing scope of the camera so that the camera can generate a gesture video transmitted to an identification module, then the identification module, through analyzing color, outline, structured light of gesture images in the video, identifies position of the hand, detects and splits gesture objects, extracts gesture features and tracks corresponding gesture motion; then the direction of fingers and a motion direction sequence is processed, finally the gesture action is completely identified, then the operation intention of the user's action can be determined by methods such as comparing with a space of predefined gesture actions.

It should be noted that in the embodiment of the disclosure, an eyeball action and a body gesture can also be used in addition to the aforementioned gesture actions. In addition, the network service capability of the pad and the TV includes a capability enabling the pad and the TV to communicate with each other through a network.

Figure 3:
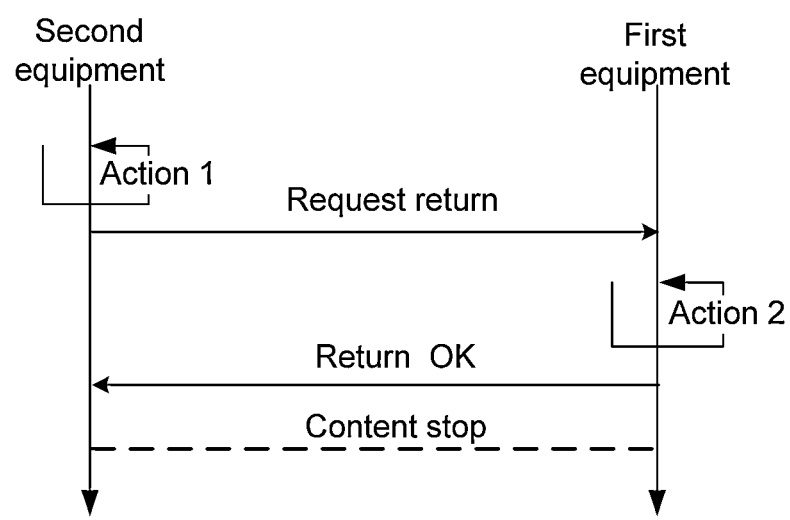
FIG. 3 is a schematic diagram showing network message flow of a control method according to an embodiment of the disclosure.

FIG. 3 is a schematic diagram showing network message flow of a control method according to an embodiment of the disclosure. Corresponding to devices in FIG. 2, the first equipment is a pad and the second equipment is a TV in FIG. 3. In the example, digital media content is firstly played on the pad, and then an operation performed by a user causes the digital media content to be transferred from the pad to the TV; for the user, a corresponding scenario and experience include: the user, sitting on a sofa in a living room of his/her residence, has transferred digital media content originally played on the pad to the TV for play, and the user is watching video content played on the TV; then the user wants to go to another room and continue watching the video with his/her pad, then a gesture operation is performed to recall the content played on the TV back to the pad so that the content is no longer played by the TV.

In an embodiment as shown in FIG. 3, devices pad and TV are connected through a network and they can communicate with each other. Specifically, the following processing are included:

step 301, digital media content being played on a pad is transferred to a TV for play.

The TV needs to store parameters such as address, port of the original equipment (pad). In addition, after the transferring of the digital media content between the pad and the TV is finished, a session connection established between the pad and the TV is to be managed.

The management of the session connection include an ID of the session, appointment of a heartbeat message, keeping of a maximum session duration and the like.

Step 302, the TV identifies the play switch back action.

The action is namely action 1 in FIG. 3, and action 1 can be any action in the aforementioned first group of actions. The TV can support and at least support one of the actions.

The identification of these actions in the TV is performed in the context and predefined, and the context includes that the TV starts to launch the identification functionality after playing the digital media content transferred from the pad; the identification of the actions is combined with usage of image identification algorithms so that the TV can identify meanings represented by respective actions, i.e., a video being display will be transferred back to its original equipment for play. In step 2, the second equipment identifies that the digital media content will be transferred to its original equipment.

Step 303, after the identification, the TV transmits a broadcast: REQUEST RETURN.

After the TV identifies actions for itself, i.e., after identifying an intention that the digital media content will be transferred to its original equipment for play, if the equipment can receive the digital media content in the broadcast message transmitted from the pad, the TV transmits a request message (i.e., the above REQUEST RETURN message) on the predefined address and port, and the information included in the message is used to request the pad to accept the transfer back of the digital media content for play.

Specifically, the information included in the message includes: name, address, port and timeout of the equipment; wherein the address is an address from which the REQUEST RETURN message is transmitted and an address for subsequent interaction; the timeout represents a valid time of the message, namely a time limit after which the request message will be invalidated (canceled).

In step 303, the second equipment requests the first equipment to get ready for reception of transferred back digital media content.

Step 304, the digital media content is transferred.

Preferably, after receiving the request message from the TV, the pad prompts a user to input confirmation information, the user can select options such as "Yes" or "No" on the pad, which corresponds to action 2 in FIG. 3.

Step 305, the pad transmits a broadcast: RETURN OK.

After confirming that the digital media content can be transferred back for play, the pad transmits, to the TV, a response message, i.e., the RETURN OK message in FIG. 3.

Step 306, the digital media content is transferred back for play.

After the above message interaction and confirmation, the pad takes over playing of the digital media content locally while the TV stops playing, and the PAD and the TV are disconnected. If the digital media content on the pad is received from another content source equipment on the network, the pad can play the digital media content from the another content source in a same way as before the content is transferred to the TV.

In the above embodiment, the first equipment may also transmit a broadcast message, that is, after identifying the intention of transferring back, the first equipment transmits a transfer message; and subsequent processes are similar to above steps; in such embodiments, the first equipment is required to store an address and port of the second equipment to which the content is transferred.

Figure 4:
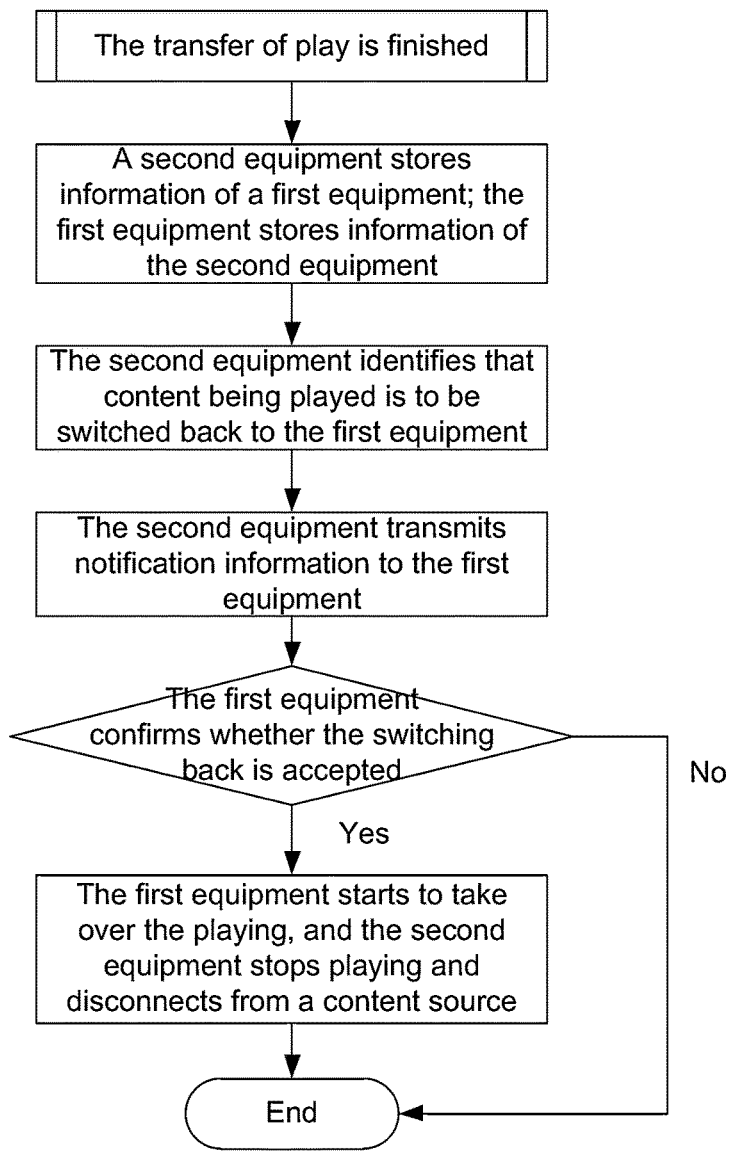
FIG. 4 is a flow chart showing processing logic according to an embodiment of the disclosure.

FIG. 4 is a flow chart showing processing logic according to an embodiment of the disclosure. For example, the pad described above may serve as the first equipment and the TV described above may serve as the second equipment.

Step 401, the transfer of play is finished, that is in the above embodiment, the digital media content is transferred from the first equipment to the second equipment for play.

Step 402, the second equipment stores information of the first equipment; the first equipment stores information of the second equipment. Such information can be an address, communication port and the like of the equipment.

Step 403, the second equipment identifies that the content being played is to be switched back to the first equipment. The "identifies" means that the second equipment performs identification through a gesture operation.

Step 404, the second equipment transmits notification information to the first equipment.

Step 405, the first equipment has to confirm whether the switching back is accepted, if yes, the first equipment starts to take over the playing, and the second equipment stops playing and disconnects from a content source. The process ends. If the first equipment confirms that the switching back is not accepted, the first equipment transmits to the second equipment a rejection message, or does not transmit any message until the message is timeout, and the second equipment still continues playing the transferred digital media content.

In the above example, the pad is taken as a first equipment, but in the disclosure the first equipment is not limited to such an equipment as a pad, and mobile phone, other players with a touch screen (remote controller) or even computers can be taken as the first equipment, and the triggering function in the above process may also be implemented by a keyboard or mouse through a computer.

In the above example, the TV is taken as a second equipment, but in the disclosure the second equipment is not limited to such an equipment as a TV, and any equipment configured with a camera and having various capabilities described in the embodiments, such as a mobile phone, a set top box, a projector, a computer and the like, can serve as the second equipment.

The above process is an embodiment to implement the disclosure, but it is not intended to limit the disclosure to the embodiment, and it is not intended to limit the specific method to implement the process; the method can be implemented using similar methods, names of modules and types of various messages are only forms for naming, and indicate that they represent different message contents.

In addition, in the above embodiment, portions related to a network may be applied to IP networks supported by communication networks such as those based on IEEE 802.3, IEEE 802.11b/g/n, POWELINE, CABLE, PSTN, a 3GPP network and a 3GPP2 network; operation systems of various devices may include a UNIX operation system, a WINDOWS operation system, an ANDROID and an IOS operation system; and user interface may include JAVA language interface.

It should be noted that in the interest of clarity, not all features of an actual equipment are shown and described in the above description. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it should be appreciated that such a development effort might be complex and time consuming, but would nevertheless be a routine undertaking of design, fabrication, and manufacture for those of ordinary skill having the benefit of this disclosure.

According to subject matters described herein, various components, systems, devices, process steps and/or data structures may be implemented using various types of operating systems, computing platforms, computer programs and/or general purpose machines. In addition, it will be appreciated by those skilled in the art that no so general devices can also be used without departing from the spirit and scope of the invention. The included method is implemented by a computer, a device or a machine, and the method can be stored as a machine-readable instruction that can be stored on a determined medium, such as a storage device of a computer, which includes and is not limited to an ROM (Read Only Memory, FLASH memory, transfer device), a magnetic storage medium (e.g., magnetic tape, magnetic drive), an optical storage medium (e.g., CD-ROM, DVD-ROM, paper card, paper tape), and other program storage of known types. In addition, it should be noted that the method can be implemented by an operator using a selected software tool without innovative determination.

Embodiments of the Device

Figure 5:
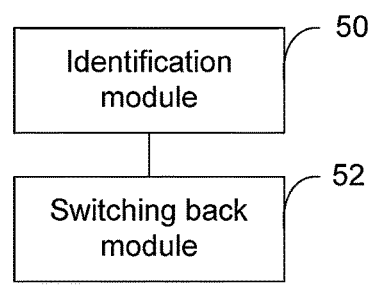
FIG. 5 is a schematic structural diagram of a device for switching back transferred-for-play digital media content according to an embodiment of the disclosure.

According to an embodiment of the disclosure, provided is a device for switching back transferred-for-play digital media content; FIG. 5 is a schematic structural diagram of a device for switching back transferred-for-play digital media content according to an embodiment of the disclosure, as shown in FIG. 5, the device for switching back transferred-for-play digital media content according to an embodiment of the disclosure includes an identification module 50 and a switching back module 52; and respective modules according to the embodiment of the disclosure will be elaborated as follows.

The identification module 50 is configured to, after digital media content being played at a first equipment is transferred to a second equipment, identify a user action.

The switching back module 52 is configured to switch the digital media content being played back to the first equipment according to the identified user action.

Preferably, the device for switching back transferred-for-play digital media content according to an embodiment of the disclosure may further include a storage module configured to store information of the first equipment; accordingly the switching back module 52 may be configured to notify, according to the information of the first equipment, the first equipment to take over playing of the digital media content.

The switching back module 52 is configured to stop playing the digital media content, and disconnect from a content source corresponding to the digital media content.

The identification module 50 is configured to identify a user action with an identification device, and the identification device may include a camera; the user action may include a gesture action, an eyeball action and a body gesture. The gesture action may include a backward bending of an arm after a grasp, a backward bending of an arm after the arm and corresponding palm are straightened to face the identification device, and a predetermined number of swings of an arm and corresponding palm towards the body of a user after being raised to face the identification device. It is determined whether the identified user action is matched with preset action determination data, if yes, the digital media content being played is switched back to the first equipment.

Preferably, the device for switching back transferred-for-play digital media content according to an embodiment of the disclosure may further include a reception module configured to receive a response message from the first equipment, and acquire information carried in the response message regarding whether switching back of the digital media content is allowed.

The switching back module 52 may be configured to, if it is determined according to the response message that the first equipment allows to switch back to the digital media content, stop playing the digital media content, and disconnect from the content source corresponding to the digital media content.

The above identification module can consist of a camera and a CPU chip; the switching back module can consist of a storage device of a computer, which includes and is not limited to an ROM (Read Only Memory, FLASH memory, transfer device), a magnetic storage medium (e.g., magnetic tape, magnetic drive), an optical storage medium (e.g., CD-ROM, DVD-ROM, paper card, paper tape), and other program storage of known types; and the reception module can consist of network interfaces.

To sum up, by means of the technical solutions according to embodiments of the disclosure, an original equipment is notified to take over playing of the digital media content through identification of a user operation, so that the content, after being subjected to inter-equipment transfer and collaborative play, can be switched back to its original equipment through an easier and more natural operation; by means of the disclosure, it is possible to provide users with more convenient experiences of and more natural and easier control of digital media content, and thus more relaxed and enjoyed entertainment, and users can understand and get started more easily when new functions of an equipment are introduced, thereby improving user experiences on the equipment.

Embodiments of the System

Figure 6:
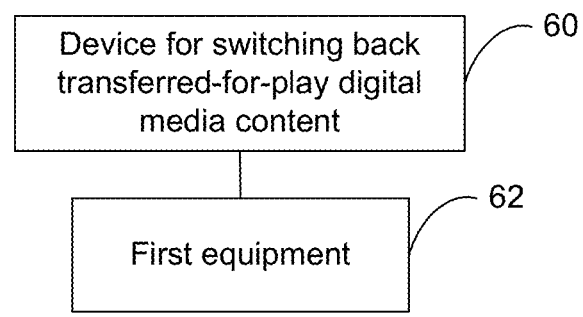
FIG. 6 is a schematic structural diagram of a system for switching back transferred-for-play digital media content according to an embodiment of the disclosure.

According to an embodiment of the disclosure, provided is a system for switching back transferred-for-play digital media content; FIG. 6 is a schematic structural diagram of a system for switching back transferred-for-play digital media content according to an embodiment of the disclosure, as shown in FIG. 6, the system for switching back transferred-for-play digital media content according to an embodiment of the disclosure includes a device 60 for switching back transferred-for-play digital media content as described in the above embodiments of the device and a first equipment 62;

The first equipment 62 is configured to, after the digital media content being played at the first equipment is transferred to the device 60 for switching back transferred-for-play digital media content, take over playing of the digital media content switched back to the first equipment under the control of the device 60 for switching back transferred-for-play digital media content.

The device 60 for switching back transferred-for-play digital media content according to the embodiment of the disclosure has been described in detail in the above embodiment of the device, therefore the detailed description thereof will be omitted.

Algorithms and displays provided herein are not inherently associated with any specific computers, virtual systems and other devices. Various general-purpose systems can also be used together with teachings herein. According to the above description, it is obvious to establish such a system. Furthermore, the disclosure is not based on any specific program languages. It should be appreciated that various program languages can be used to implement content of the disclosure described herein, and the above description of specific program languages aims to disclose the best embodiment of the disclosure.

A large number of specific details are described in the description provided herein. However, it can be appreciated that embodiments of the disclosure can be implemented without these specific details. In some examples, known methods, structures and techniques are not shown in detail so as not to blur understanding of the description.

Similarly, it should be appreciated that in order to simplify the disclosure and help to understand one or more of various aspects of the disclosure, some features of the disclosure may, in certain cases, be combined in a single embodiment, diagram or description thereof in the above description of illustrative embodiments of the disclosure. However, this method of the disclosure is not to be interpreted as reflecting an intention that the claimed embodiments of the subject matter requires more features than are expressly recited in each claim. More specifically, as the following claims reflect, the invention may lie in less than all features of a single disclosed embodiment. Thus the claims following the specific embodiments are hereby incorporated into the detailed description, with each claim standing on its own as a separate embodiment.

It can be appreciated by those skilled in the art that modules in the device in an embodiment can be changed adaptively and arranged in one or more device different from the embodiment. Modules, units or assemblies in the embodiments can be combined into a module, unit or assembly, and they can also be divided into multiple sub-modules, sub-units or sub-assemblies. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings), may be replaced by alternative features serving the same, equivalent or similar purpose, unless expressly stated otherwise.

Furthermore, while some embodiment described herein include some but not other features included in other embodiments, combinations of features of different embodiments are meant to be within the scope of the invention and form different embodiments, as would be understood by those skilled in the art. For example, in the following claims, any one of the claimed embodiments can be combined in any combination.

It should be noted that the above-mentioned embodiments illustrate rather than limit the invention, and that those skilled in the art will be capable of designing many alternative embodiments without departing from the scope of the invention as defined by the appended claims. Any reference sings placed between parentheses shall not be construed as limiting the claim. The word "comprising" does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. Several of these means can be embodied by one and the same item of hardware. The use of the words first, second and third etc do not indicate any ordering. These words are to be interpreted as names.

The invention claimed is:

1. A method for switching back transferred-for-play digital media content, comprising:
   after digital media content being played at a first equipment is transferred to a second equipment, identifying, by the second equipment, a user action;
   requesting the first equipment, by the second equipment, to get ready for reception of transferred back digital media content according to the identified user action;
   receiving from the first equipment, by the second equipment, a response message for confirming the request; and
   switching, by the second equipment, the digital media content being played back to the first equipment according to the response message, wherein requesting the first equipment, by the second equipment, to get ready for reception of transferred back digital media content according to the identified user action comprises: identifying, by the second equipment, a user action with an identification device; and determining whether the identified user action is matched with preset action determination data, if the identified user action is matched with the preset action determination data, requesting the first equipment to get ready for reception of transferred back digital media content, wherein the identification device comprises a camera; and wherein the user action comprises a gesture action, an eyeball action and a body gesture, wherein the gesture action comprises a backward bending of an arm after a grasp, a backward bending of an arm after the arm and corresponding palm are straightened to face the identification device, and a predetermined number of swings of an arm and corresponding palm towards the body of a user after being raised to face the identification device.

2. The method according to claim 1, further comprising: after the digital media content being played at the first equipment is transferred to the second equipment, storing, by the second equipment, information of the first equipment;
wherein the switching, by the second equipment, the digital media content being played back to the first equipment comprises: notifying, by the second equipment according to the information of the first equipment, the first equipment to take over playing of the digital media content.

3. The method according to claim 2, further comprising: after the notifying, by the second equipment according to the information of the first equipment, the first equipment to take over playing of the digital media content, stopping, by the second equipment, playing the digital media content, and disconnecting from a content source corresponding to the digital media content.

4. The method according to claim 3, further comprising: after the notifying, by the second equipment according to the information of the first equipment, the first equipment to take over playing of the digital media content,
receiving, by the second equipment, a response message from the first equipment, and acquiring information carried in the response message regarding whether switching back of the digital media content is allowed.

5. The method according to claim 4, wherein the stopping, by the second equipment, playing the digital media content and disconnecting from a content source corresponding to the digital media content comprises:
if determining according to the response message that the first equipment allows to switch back to the digital media content, stopping, by the second equipment, playing the digital media content, and disconnecting from the content source corresponding to the digital media content.

6. The method according to claim 1, wherein
the first equipment and the second equipment are connected with each other through a network.

7. The method according to claim 1, further comprising: after the notifying, by the second equipment according to the information of the first equipment, the first equipment to take over playing of the digital media content,
receiving, by the second equipment, a response message from the first equipment, and acquiring information carried in the response message regarding whether switching back of the digital media content is allowed.

8. The method according to claim 7, wherein the stopping, by the second equipment, playing the digital media content and disconnecting from a content source corresponding to the digital media content comprises:
if determining according to the response message that the first equipment allows to switch back to the digital media content, stopping, by the second equipment, playing the digital media content, and disconnecting from the content source corresponding to the digital media content.

9. The method according to claim 1, further comprising: after the notifying, by the second equipment according to the information of the first equipment, the first equipment to take over playing of the digital media content,
receiving, by the second equipment, a response message from the first equipment, and acquiring information carried in the response message regarding whether switching back of the digital media content is allowed.

10. The method according to claim 9, wherein the stopping, by the second equipment, playing the digital media content and disconnecting from a content source corresponding to the digital media content comprises:
if determining according to the response message that the first equipment allows to switch back to the digital media content, stopping, by the second equipment, playing the digital media content, and disconnecting from the content source corresponding to the digital media content.

11. A device for switching back transferred-for-play digital media content, comprising an identification module and a switching back module,
wherein the identification module is configured to, after digital media content being played at a first equipment is transferred to a second equipment, identify a user action, and request the first equipment to get ready for reception of transferred back digital media content according to the identified user action; and
wherein the switching back module is configured to receive from the first equipment a response message for confirming the request, and switch the digital media content being played back to the first equipment according to the response message,
wherein the identification module is configured to identify a user action with an identification device, and determine whether the identified user action is matched with preset action determination data, if the identified user action is matched with the preset action, request the first equipment to get ready for reception of transferred back digital media content, wherein the identification device comprises a camera; and wherein the user action comprises a gesture action, an eyeball action and a body gesture, wherein the gesture action comprises a backward bending of an arm after a grasp, a backward bending of an arm after the arm and corresponding palm are straightened to face the identification device, and a predetermined number of swings of an arm and corresponding palm towards the body of a user after being raised to face the identification device.

12. The device according to claim 11, further comprising a storage module configured to store information of the first equipment;
wherein the switching back module is configured to notify, according to the information of the first equipment, the first equipment to take over playing of the digital media content.

13. The device according to claim 12, wherein the switching back module is configured to stop playing the digital media content, and disconnect from a content source corresponding to the digital media content.

14. The device according to claim 13, further comprising a reception module configured to receive a response message from the first equipment, and acquire information carried in the response message regarding whether switching back of the digital media content is allowed.

15. The device according to claim 14, wherein the switching back module is configured to, if it is determined according to the response message that the first equipment allows to switch back to the digital media content, stop playing the digital media content, and disconnect from the content source corresponding to the digital media content.

16. The device according to claim 11, wherein the first equipment and the second equipment are connected with each other through a network.

17. The device according to claim 11, further comprising a reception module configured to receive a response message from the first equipment, and acquire information carried in the response message regarding whether switching back of the digital media content is allowed.

18. A system for switching back transferred-for-play digital media content, comprising a device for switching back transferred-for-play digital media content and a first equipment, wherein the first equipment is configured to, after the digital media content being played at the first equipment is transferred to the device for switching back transferred-for-play digital media content, take over playing of the digital media content switched back to the first equipment under control of the device for switching back transferred-for-play digital media content, and wherein the device for switching back transferred-for-play digital media content comprises an identification module and a switching back module, wherein the identification module is configured to, after digital media content being played at a first equipment is transferred to a second equipment, identify a user action the first equipment and the second equipment are connected with each other through a network; and wherein the switching back module is configured to receive from the first equipment a response message for confirming the request, and switch the digital media content being played back to the first equipment according to the response message, wherein the identification module is configured to identify a user action with an identification device, and determine whether the identified user action is matched with preset action determination data, if the identified user action is matched with the preset action determination data, request the first equipment to get ready for reception of transferred back digital media content, wherein the identification device comprises a camera; and wherein the user action comprises a gesture action, an eyeball action and a body gesture, wherein the gesture action comprises a backward bending of an arm after a grasp, a backward bending of an arm after the arm and corresponding palm are straightened to face the identification device, and a predetermined number of swings of an arm and corresponding palm towards the body of a user after being raised to face the identification device.

* * * * *